(12) United States Patent
Huang et al.

(10) Patent No.: US 9,182,849 B2
(45) Date of Patent: Nov. 10, 2015

(54) CAPACITIVE TOUCH SYSTEM AND METHOD OF OPERATING A CAPACITIVE TOUCH SYSTEM

(75) Inventors: Tzu-Hsuan Huang, Taipei (TW);
Chih-Yin Chiang, Nantou County (TW); Ju-Yi Hsieh, Taoyuan County (TW)

(73) Assignee: Chunghwa Picture Tubes, Ltd., Longtan Dist., Taoyuan (TW)

( * ) Notice: Subject to any disclaimer, the term of this patent is extended or adjusted under 35 U.S.C. 154(b) by 715 days.

(21) Appl. No.: 13/562,329

(22) Filed: Jul. 31, 2012

(65) Prior Publication Data
US 2014/0002411 A1 Jan. 2, 2014

(30) Foreign Application Priority Data
Jun. 28, 2012 (TW) .............................. 101123219 A

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ...................................................... G06F 3/044
USPC .................................................. 345/173–179
See application file for complete search history.

(56) References Cited

U.S. PATENT DOCUMENTS

| 2011/0141052 A1* | 6/2011 | Bernstein et al. ............. 345/174 |
| 2011/0181519 A1 | 7/2011 | Tsai |
| 2013/0215056 A1* | 8/2013 | Johansson et al. ............ 345/173 |

FOREIGN PATENT DOCUMENTS

| CN | 102135829 A | 7/2011 |
| CN | 102308269 A | 1/2012 |
| TW | 201030574 | 8/2010 |
| TW | 201145127 | 12/2011 |
| TW | 201220164 | 5/2012 |

* cited by examiner

*Primary Examiner* — Waseem Moorad
(74) *Attorney, Agent, or Firm* — Winston Hsu; Scott Margo

(57) ABSTRACT

A capacitive touch system includes a touch panel, a detection circuit, and a microprocessor. The touch panel includes a plurality of scan areas. Each scan area of the plurality of scan areas includes a plurality of sensing units. The detection circuit is coupled to the touch panel for utilizing the Wheatstone bridge principle to transmit driving signals to the plurality of scan areas in turn to generate a detection result corresponding to each scan area of the plurality of scan areas according to a predetermined timing. The microprocessor is used for generating the predetermined timing to the detection circuit, and determining whether each area is touched according to a detection result corresponding to each scan area.

15 Claims, 5 Drawing Sheets

CAPACITIVE TOUCH SYSTEM AND METHOD OF OPERATING A CAPACITIVE TOUCH SYSTEM

BACKGROUND OF THE INVENTION

1. Field of the Invention

The present invention relates to a capacitive touch system and a method of operating a capacitive touch system, and particularly to a capacitive touch system and a method of operating a capacitive touch system that can utilize the Wheatstone bridge principle to quickly detect whether the touch panel is touched.

2. Description of the Prior Art

Please refer to FIG. 1, FIG. 2, and FIG. 3. FIG. 1 is a diagram illustrating a touch panel 100, FIG. 2 is a diagram illustrating a detection circuit 200 of the touch panel 100, and FIG. 3 is a diagram illustrating the detection circuit 200 detecting the touch panel 100 touched by a finger and the touch panel 100 not touched by the finger. As shown in FIG. 1, the touch panel 100 includes a plurality of sensing lines XS1-XSN along an X axis and a plurality of sensing lines YS1-YSM along a Y axis, where each sensing line is coupled to a plurality of sensing units, and N, M are integers. As shown in FIG. 2, a current source 202 of the detection circuit 200 can charge the plurality of sensing lines XS1-XSN and the plurality of sensing lines YS1-YSM in turn according to a predetermined timing. Therefore, the detection circuit 200 can detect a location of a touch point on the touch panel 100 through capacitance variation of a parasitic capacitor SC of two adjacent sensing units of the touch panel 100. As shown in FIG. 2 and FIG. 3, when the touch panel 100 is not touched by the finger, a period for a parasitic capacitor SC between two adjacent sensing units of the plurality of sensing lines XS1-XSN (or the plurality of sensing lines YS1-YSM) being charged to a reference voltage VREF is T1. That is to say, when the parasitic capacitor SC is charged to the reference voltage VREF, a comparator 204 generates a reset signal RS to a counter 206 and a switch 208. Meanwhile, the counter 206 can record the period T1 according to a clock CLK and the reset signal RS of the counter 206 and reset a count of the counter 206 at the period T1, and the switch 208 can reset a potential stored in the parasitic capacitor SC according to the reset signal RS at the period T1 and make an output of the comparator 204 back to an initial state. As shown in FIG. 2 and FIG. 3, when the touch panel 100 is touched by the finger, a period for a parasitic capacitor SC' (because the parasitic capacitor SC' is equal to the parasitic capacitor SC being in parallel with a parasitic capacitor caused by the finger, the parasitic capacitor SC' is greater than the parasitic capacitor SC) between two adjacent sensing units of the plurality of sensing lines XS1-XSN (or the plurality of sensing lines YS1-YSM) touched by the finger being charged to the reference voltage VREF is T2, where the period T2 is greater than the period T1. Therefore, the touch panel 100 can repeat the above mentioned process to detect a touch point of the touch panel 100 through a timing controller. However, the above mentioned detection method can have a slower detection speed, not realize a multi-touch function easily, and be influenced by noise easily.

SUMMARY OF THE INVENTION

An embodiment provides a capacitive touch system. The capacitive touch system includes a touch panel, a detection circuit, and a microprocessor. The touch panel includes a plurality of scan areas, where each scan area of the plurality of scan areas includes a plurality of sensing units. The detection circuit is coupled to the touch panel for utilizing the Wheatstone bridge principle to transmit driving signals to the plurality of scan areas in turn to generate a detection result corresponding to each scan area of the plurality of scan areas according to a predetermined timing. The microprocessor is used for generating the predetermined timing to the detection circuit, and determining whether each area is touched according to a detection result corresponding to each scan area.

Another embodiment provides a method of operating a capacitive touch system, and the capacitive touch system includes a touch panel, a detection circuit, and a microprocessor, where the touch panel includes a plurality of scan areas, and each scan area of the plurality of scan areas includes a plurality of sensing units. The method includes the microprocessor generating a first predetermined timing; the detection circuit utilizing the Wheatstone bridge principle to transmit driving signals to the plurality of scan areas in turn to generate a detection result corresponding to each scan area of the plurality of scan areas according to the first predetermined timing; and the microprocessor executing a corresponding operation according to a detection result corresponding to each scan area.

The present invention provides a capacitive touch system and a method of operating a capacitive touch system. The capacitive touch system and the method utilize a detection circuit to transmit driving signals to a plurality of scan areas of a touch panel in turn according to the Wheatstone bridge principle and a predetermined timing to generate a detection result corresponding to each scan area of the plurality of scan areas. Then, a microprocessor can determine whether each scan area is touched according to a detection result corresponding to each scan area. When the microprocessor determines that a scan area is touched, the microprocessor can notifies the detection circuit to transmit a driving signal to each sensing unit of the scan area according to another predetermined timing to generate a detection result corresponding to each sensing unit of the scan area. Compared to the prior art, because the detection circuit only detects a pair of parasitic capacitors in each scan area, time for the detection circuit scanning the plurality of scan areas of the touch panel can be reduced. Thus, the present invention not only can quickly detect the touch panel whether to be touched, but can also utilize the Wheatstone bridge principle to reduce noise of the touch panel to further achieve a multi-touch purpose.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
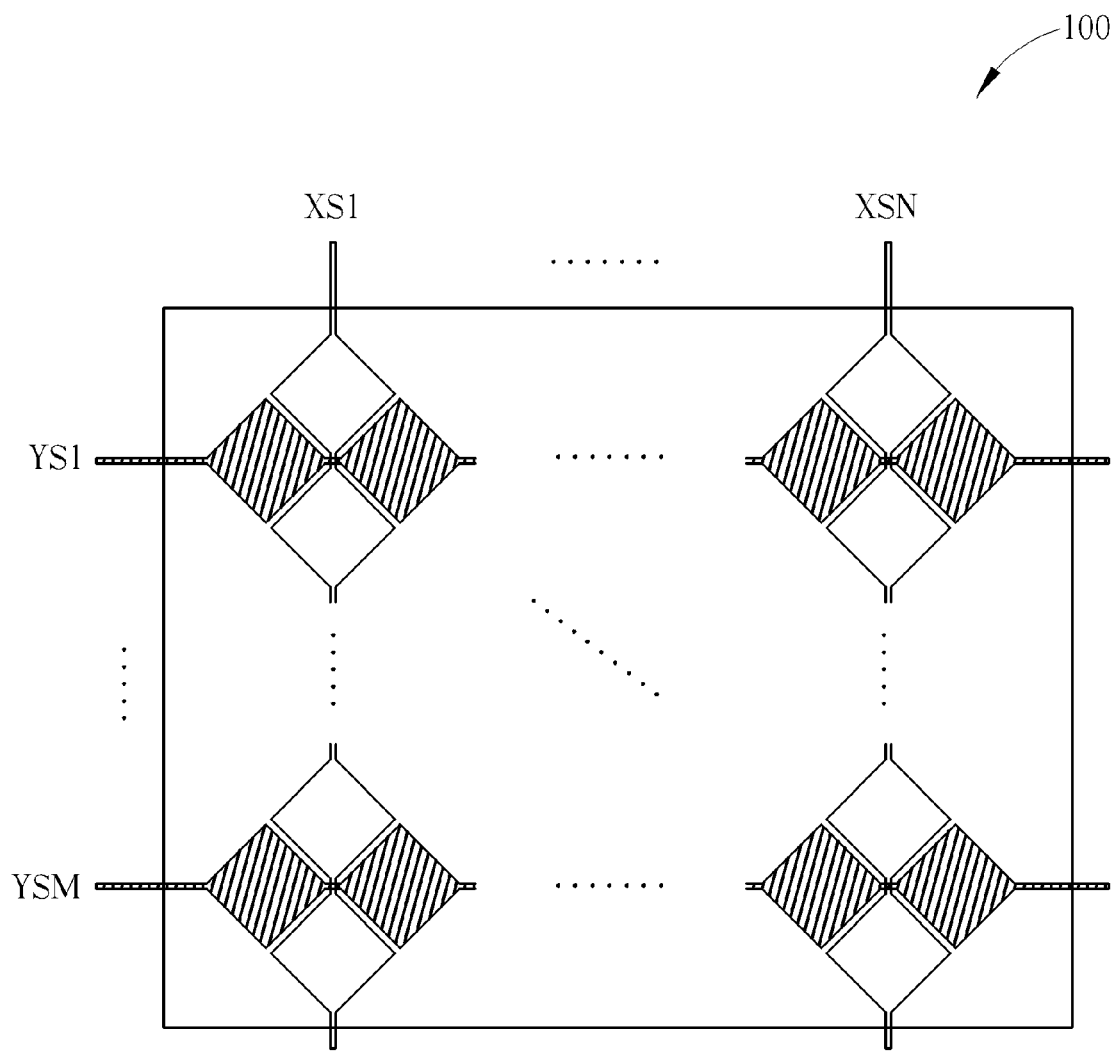
FIG. 1 is a diagram illustrating a touch panel.
Figure 2:
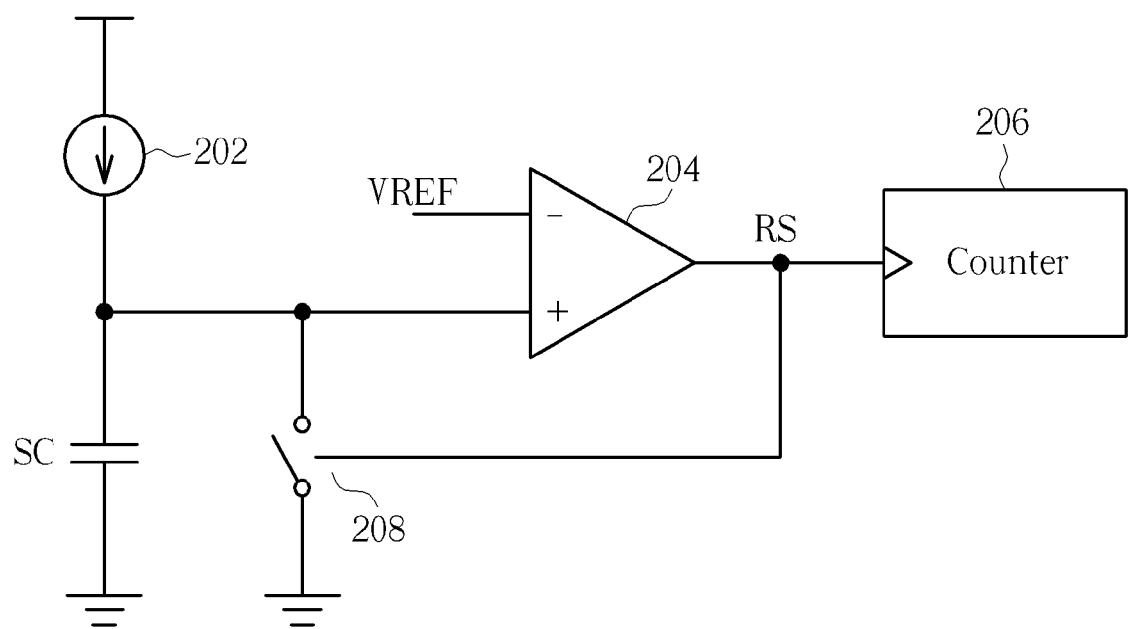
FIG. 2 is a diagram illustrating a detection circuit f the touch panel.
Figure 3:
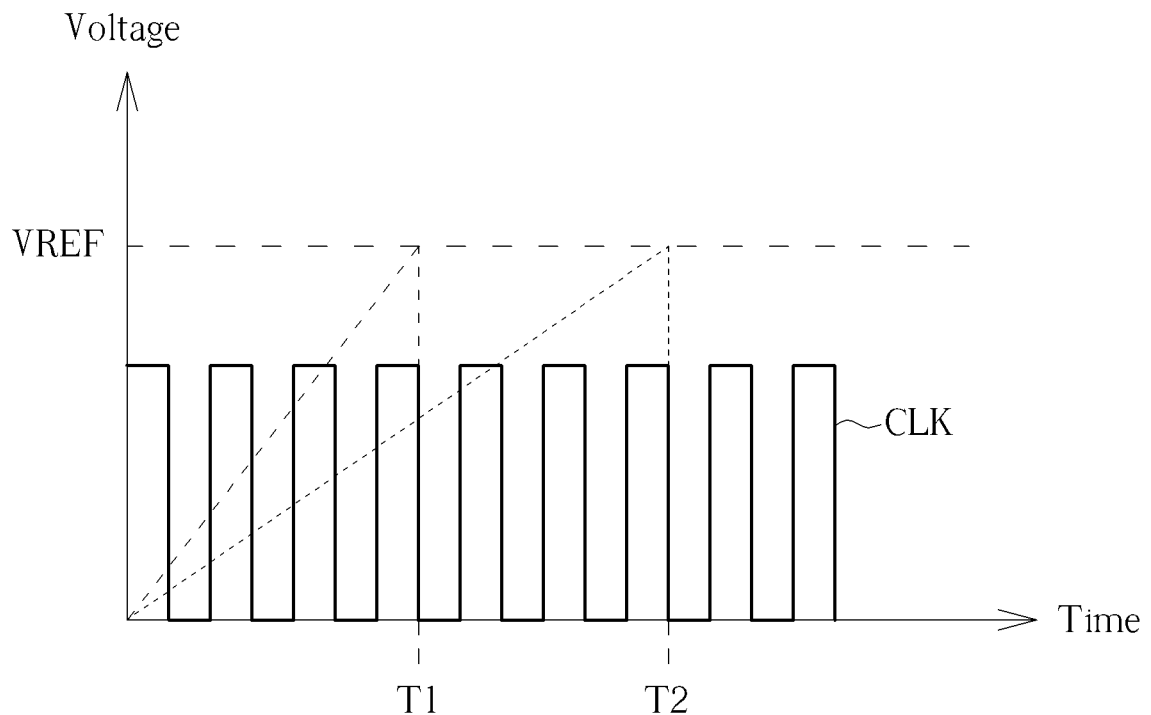
FIG. 3 is a diagram illustrating the detection circuit detecting a finger touching the touch panel and the finger not touching the touch panel.
Figure 4:
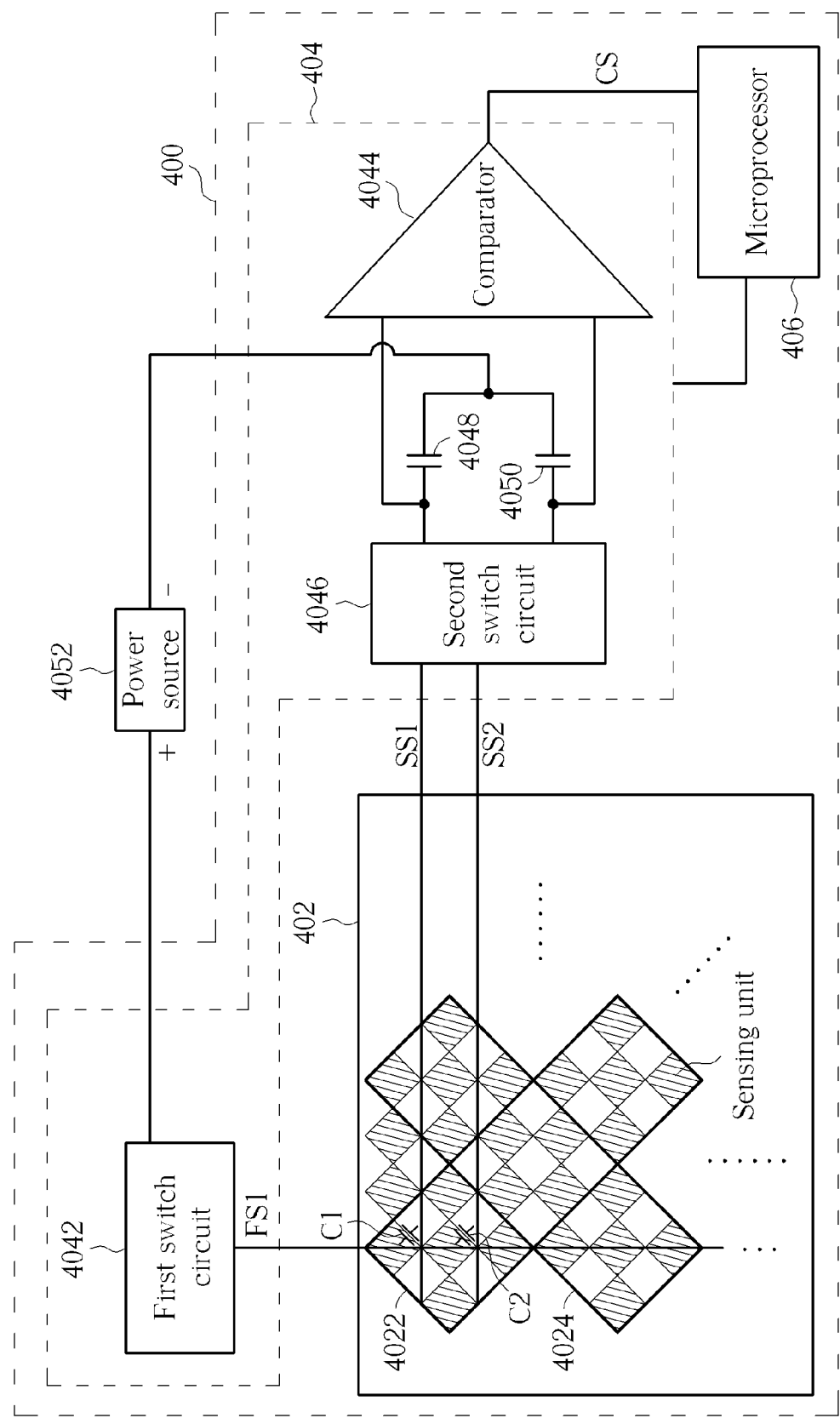
FIG. 4 is a diagram illustrating a capacitive touch system according to an embodiment.

Please refer to FIG. 4. FIG. 4 is a diagram illustrating a capacitive touch system 400 according to an embodiment.

The capacitive touch system 400 includes a touch panel 402, a detection circuit 404, and a microprocessor 406. The touch panel 402 includes a plurality of scan areas, where each scan area of the plurality of scan areas includes a plurality of sensing units (as shown in FIG. 4, each scan area includes 9 sensing units). But, the present invention is not limited to each scan area including 9 sensing units. In addition, the touch panel 402 can be a projected capacitive touch panel, and be also a mutual capacitance touch panel. The detection circuit 404 is coupled to the touch panel 402 for utilizing the Wheatstone bridge principle to transmit a driving signal to each scan area column of the plurality of scan areas of the touch panel 402 in turn according to a predetermined timing to generate a detection result corresponding to each scan area of the plurality of scan areas of the touch panel 402. But, in another embodiment of the present invention, the detection circuit 404 utilizes the Wheatstone bridge principle to transmit a driving signal to each scan area row of the plurality of scan areas of the touch panel 402 in turn to generate a detection result corresponding to each scan area of the plurality of scan areas of the touch panel 402 according to the predetermined timing. The microprocessor 406 is used for generating the predetermined timing to the detection circuit 404, and determining whether each scan area is touched according to a detection result corresponding to each scan area.

As shown in FIG. 4, the detection circuit 404 includes a first switch circuit 4042, a comparator 4044, a second switch circuit 4046, a variable capacitor 4048, and a fixed capacitor 4050. The first switch circuit 4042 is used for connecting a first sensing line FS1 corresponding to a scan area 4022 to a first terminal of the power source 4052. The second switch circuit 4046 is used for connecting two adjacent second sensing lines SS1, SS2 corresponding to the scan area 4042 to the comparator 4044. The variable capacitor 4048 has a first terminal coupled to the second sensing line SS1 and the comparator 4044, and a second terminal coupled to a second terminal of the power source 4052. The fixed capacitor 4050 has a first terminal coupled to the second sensing line SS2 and the comparator 4044, and a second terminal coupled to the second terminal of the power source 4052. As shown in FIG. 4, the first sensing line FS1 is located at a first axis of the touch panel 402, and the second sensing lines SS1, SS2 are located at a second axis of the touch panel 402. In addition, the scan area 4022 is only used for describing a function of the detection circuit 404. That is to say, the present invention is not limited to the detection circuit 404 only being coupled to the scan area 4022.

As shown in FIG. 4, when the detection circuit 404 transmits a driving signal to a first scan area column of the plurality of scan areas (that is, the detection circuit 404 transmits the driving signal to the first sensing line FS1) according to the predetermined timing, the second switch circuit 4046 can connect the second sensing lines SS1, SS2 corresponding to the scan area 4022 to the comparator 4044. As shown in FIG. 4, a relationship between parasitic capacitors C1, C2 of the scan area 4022 corresponding to the first sensing line FS1 and the second sensing line SS1, SS2, the variable capacitor 4048, and the fixed capacitor 4050 can be determined by equation (1):

$$\frac{C1}{C2} = \frac{C_{4048}}{C_{4050}} \quad (1)$$

As shown in equation (1), $C_{4048}$ is a capacitance of the variable capacitor 4048, and $C_{4050}$ is a capacitance of the fixed capacitor 4050. Meanwhile, because when the scan area 4022 is not touched, the capacitance of the variable capacitor 4048 is not changed, the comparator 4044 does not generate a detection result CS to the microprocessor 406, resulting in the microprocessor 406 determining that the scan area 4022 is not touched. Then, the microprocessor 406 notifies the second switch circuit 4046 of the detection circuit 404 to connect two second sensing lines corresponding to a next scan area (that is, a scan area 4024 coupled to the first sensing line FS1) to the comparator 4044. Therefore, the microprocessor 406 can determine whether the scan area 4024 is touched according to a detection result corresponding to the scan area 4024. In addition, when the scan area 4022 is touched, the relationship between the parasitic capacitors C1, C2 of the scan area 4022 corresponding to the first sensing line FS1 and the second sensing line SS1, SS2, the variable capacitor 4048, and the fixed capacitor 4050 is still determined by equation (1). But, capacitances of the parasitic capacitor C1, C2 are changed by at least one object, so the capacitance of the variable capacitor 4048 needs to be changed to satisfy equation (1). Therefore, when capacitance variation of the variable capacitor 4048 is greater than a predetermined value, the comparator 4044 can generate the detection result CS to the microprocessor 406. Then, the microprocessor 406 can determine that the scan area 4022 is touched according to the detection result CS. Thus, by repeating the above mentioned process, the microprocessor 406 can quickly determine whether scan areas of the touch panel 402 coupled to the first sensing line FS1 and other first sensing lines are touched. In addition, the present invention is not limited to the detection circuit 404 detecting the parasitic capacitors C1, C2 in the scan area 4022. That is to say, the detection circuit 404 can detect other parasitic capacitors within the scan area 4022. But, the detection circuit 404 only detects a pair of parasitic capacitors in each scan area to reduce time for the detection circuit 404 detecting the plurality of scan areas of the touch panel 402.

When the microprocessor 406 determines that the scan area 4022 is touched according to the detection result CS, the detection circuit 404 can transmit a driving signal to each sensing unit of the scan area 4022 according to another predetermined timing to generate a detection result corresponding to each sensing unit of the scan area 4022. Then, the microprocessor 406 can calculate coordinates of at least one touch point of the scan area 4022 according to a detection result corresponding to each sensing unit of the scan area 4022 and an interpolation method. After the microprocessor 406 calculates the coordinates of the at least one touch point of the scan area 4022, the microprocessor 406 can notify the second switch circuit 4046 of the detection circuit 404 to connect two second sensing lines corresponding to a next scan area (that is, the scan area 4024 coupled to the first sensing line FS1) to the comparator 4044. Therefore, the microprocessor 406 can determine whether the scan area 4024 is touched according to a detection result corresponding to the scan area 4024.

Figure 5:
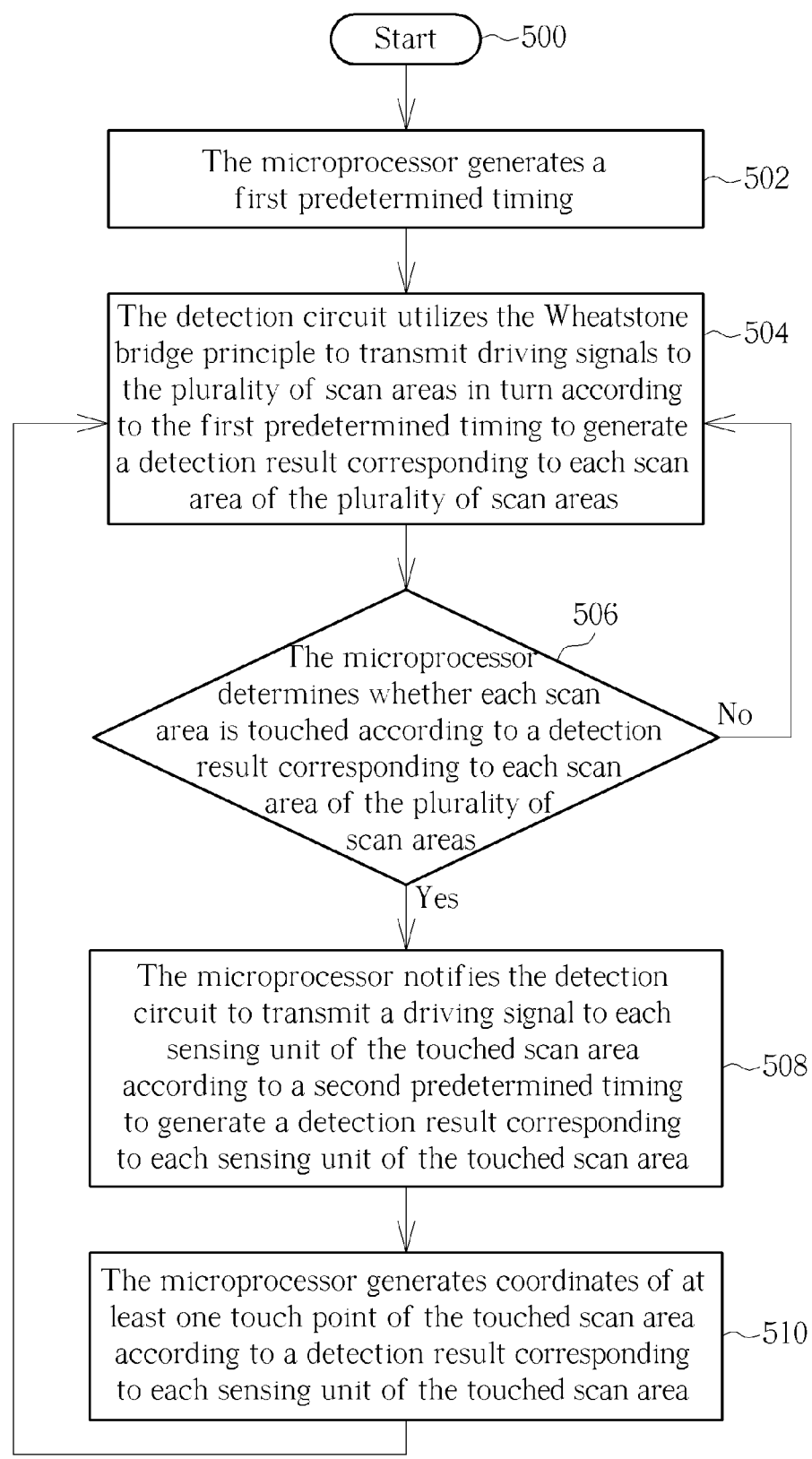
FIG. 5 is a flowchart illustrating a method of operating a capacitive touch system according to another embodiment.

Please refer to FIG. 4 and FIG. 5. FIG. 5 is a flowchart illustrating a method of operating a capacitive touch system according to another embodiment. The method in FIG. 5 is illustrated using the capacitive touch system 400 in FIG. 4. Detailed steps are as follows:

Step 500: Start.

Step 502: The microprocessor 406 generates a first predetermined timing.

Step 504: The detection circuit 404 utilizes the Wheatstone bridge principle to transmit driving signals to the plurality of scan areas in turn according to the first predetermined timing to generate a detection result corresponding to each scan area of the plurality of scan areas.

Step 506: The microprocessor 406 determines whether each scan area is touched according to a detection result corresponding to each scan area of the plurality of scan areas. If yes, go to Step 508; if no, go to Step 504.

Step 508: The microprocessor 406 notifies the detection circuit 404 to transmit a driving signal to each sensing unit of the touched scan area according to a second predetermined timing to generate a detection result corresponding to each sensing unit of the touched scan area.

Step 510: The microprocessor 406 generates coordinates of at least one touch point of the touched scan area according to a detection result corresponding to each sensing unit of the touched scan area; go to Step 504.

As shown in FIG. 4, in Step 504, the detection circuit 404 utilizes the Wheatstone bridge principle to transmit a driving signal to each scan area column of the plurality of scan areas of the touch panel 402 in turn according to the first predetermined timing to generate a detection result corresponding to each scan area of the plurality of scan areas of the touch panel 402. But, in another embodiment of the present invention, the detection circuit 404 utilizes the Wheatstone bridge principle to transmit a driving signal to each scan area row of the plurality of scan areas of the touch panel 402 in turn according to the first predetermined timing to generate a detection result corresponding to each scan area of the plurality of scan areas of the touch panel 402. For example, when the detection circuit 404 transmits a driving signal to a first scan area column of the plurality of scan areas according to the first predetermined timing (that is, the detection circuit 404 transmits the driving signal to the first sensing line FS1), the second switch circuit 4046 can connect the second sensing lines SS1, SS2 corresponding to the scan area 4022 to the comparator 4044. Thus, the comparator 4044 can determine whether to generate a detection result CS corresponding to the scan area 4022 to the microprocessor 406 according to capacitance variation of the variable capacitor 4048. That is to say, when the capacitance variation of the variable capacitor 4048 is greater than a predetermined value, the comparator 4044 can generate the detection result CS corresponding to the scan area 4022 to the microprocessor 406. In Step 506, the microprocessor 406 can determine that the scan area 4022 is not touched because the detection result CS corresponding to the scan area 4022 is not generated by the comparator 4044. In Step 508, when the microprocessor 406 determines that the scan area 4022 is touched according to the detection result CS, the detection circuit 404 can transmit a driving signal to each sensing unit of the scan area 4022 to generate a detection result corresponding to each sensing unit of the scan area 4022 according to the second predetermined timing. Then, the microprocessor 406 can calculate coordinates of at least one touch point of the scan area 4022 according to a detection result corresponding to each sensing unit of the scan area 4022 and an interpolation method. Step 504 is repeated again after the microprocessor 406 calculates the coordinates of the at least one touch point of the scan area 4022. Then, the microprocessor 406 can notify the second switch circuit 4046 of the detection circuit 404 to connect two second sensing lines corresponding to a next scan area (that is, the scan area 4024 coupled to the first sensing line FS1) to the comparator 4044. Therefore, the detection circuit 404 can generate a detection result corresponding to the scan area 4024, and the microprocessor 406 can determine whether the scan area 4024 is touched according to the detection result corresponding to the scan area 4024. Thus, by repeating the above mentioned process, the microprocessor 406 can quickly determine whether scan areas of touch panel 402 coupled to the first sensing line FS1 and other first sensing lines are touched.

To sum up, the capacitive touch system and the method of operating the capacitive touch system utilize the Wheatstone bridge principle to transmit driving signals to the plurality of scan areas of the touch panel in turn according to a predetermined timing to generate a detection result corresponding to each scan area of the plurality of scan areas. Then, the microprocessor can determine whether each scan area is touched according to a detection result corresponding to each scan area. When the microprocessor determines that a scan area is touched, the microprocessor can notifies the detection circuit to transmit a driving signal to each sensing unit of the scan area according to another predetermined timing to generate a detection result corresponding to each sensing unit of the scan area. Compared to the prior art, because the detection circuit only detects a pair of parasitic capacitors in each scan area, time for the detection circuit scanning the plurality of scan areas of the touch panel can be reduced. Thus, the present invention not only can quickly detect the touch panel whether to be touched, but can also utilize the Wheatstone bridge principle to reduce noise of the touch panel to further achieve a multi-touch purpose.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitive touch system, comprising:
   a touch panel comprising a plurality of scan areas, wherein each scan area of the plurality of scan areas comprises a plurality of sensing units;
   a detection circuit coupled to the touch panel for utilizing the Wheatstone bridge principle to transmit driving signals to the plurality of scan areas in turn to generate a detection result corresponding to each scan area of the plurality of scan areas according to a predetermined timing, the detection circuit comprising:
      a first switch circuit for connecting a first sensing line corresponding to a scan area to a first terminal of a power source;
      a comparator;
      a second switch circuit for connecting two adjacent second sensing lines corresponding to the scan area to the comparator;
      a variable capacitor having a first terminal coupled to a second sensing line of the two adjacent second sensing lines and the comparator, and a second terminal coupled to a second terminal of the power source; and
      a fixed capacitor having a first terminal coupled to another second sensing line of the two adjacent second sensing lines and the comparator, and a second terminal coupled to the second terminal of the power source; and
   a microprocessor for generating the predetermined timing to the detection circuit, and determining whether each scan area is touched according to a detection result corresponding to each scan area.

2. The capacitive touch system of claim 1, wherein the touch panel is a projected capacitive touch panel.

3. The capacitive touch system of claim 2, wherein the projected capacitive touch panel is a mutual capacitance touch panel.

4. The capacitive touch system of claim 1, wherein the detection circuit transmitting the driving signals to the plurality of scan areas in turn according to the predetermined timing is the detection circuit transmitting a driving signal to each scan area row of the plurality of scan areas in turn according to the predetermined timing.

5. The capacitive touch system of claim 1, wherein the detection circuit transmitting the driving signals to the plurality of scan areas in turn according to the predetermined timing is the detection circuit transmitting a driving signal to each scan area column of the plurality of scan areas in turn according to the predetermined timing.

6. The capacitive touch system of claim 1, wherein the microprocessor determining whether the scan area is touched according to the detection result corresponding to the scan area is the microprocessor determining that the scan area is touched when capacitance variation of the variable capacitor comprised in the detection circuit is greater than a predetermined value.

7. The capacitive touch system of claim 1, wherein the first sensing line is located at a first axis of the touch panel, and the two adjacent second sensing lines are located at a second axis of the touch panel.

8. The capacitive touch system of claim 1, wherein the microprocessor is further used for calculating coordinates of at least one touch point of a scan area when the scan area is touched by at least one object.

9. A method of operating a capacitive touch system, the capacitive touch system comprising a touch panel, a detection circuit, and a microprocessor, the touch panel comprising a plurality of scan areas, and each scan area of the plurality of scan areas comprising a plurality of sensing units, the method comprising:
  the microprocessor generating a first predetermined timing;
  the detection circuit utilizing the Wheatstone bridge principle to transmit driving signals to the plurality of scan areas in turn to generate a detection result corresponding to each scan area of the plurality of scan areas according to the first predetermined timing, wherein the detection circuit comprises:
    a first switch circuit for connecting a first sensing line corresponding to a scan area to a first terminal of a power source;
    a comparator;
    a second switch circuit for connecting two adjacent second sensing lines corresponding to the scan area to the comparator;
    a variable capacitor having a first terminal coupled to a second sensing line of the two adjacent second sensing lines and the comparator, and a second terminal coupled to a second terminal of the power source; and
    a fixed capacitor having a first terminal coupled to another second sensing line of the two adjacent second sensing lines and the comparator, and a second terminal coupled to the second terminal of the power source; and
  the microprocessor executing a corresponding operation according to a detection result corresponding to each scan area.

10. The method of claim 9, wherein the microprocessor executing the corresponding operation according to the detection result corresponding to the scan area is the microprocessor determining whether a next scan area is touched when the microprocessor determines that the scan area is not touched according to the detection result corresponding to the scan area.

11. The method of claim 9, wherein the microprocessor executing the corresponding operation according to the detection result corresponding to the scan area is the microprocessor notifying the detection circuit to transmit a driving signal to each sensing unit of the scan area according to a second predetermined timing to generate a detection result corresponding to each sensing unit of the scan area when the microprocessor determines that the scan area is touched according to the detection result corresponding to the scan area.

12. The method of claim 11, further comprising:
  the microprocessor calculating coordinates of at least one touch point of the scan area according to a detection result corresponding to each sensing unit of the scan area.

13. The method of claim 11, wherein the microprocessor determining that the scan area is touched according to the detection result corresponding to the scan area is the microprocessor determining that the scan area is touched when capacitance variation of the variable capacitor comprised in the detection circuit is greater than a predetermined value.

14. The method of claim 9, wherein the detection circuit transmitting the driving signals to the plurality of scan areas in turn according to the first predetermined timing is the detection circuit transmitting a driving signal to each scan area row of the plurality of scan areas in turn according to the first predetermined timing.

15. The method of claim 9, wherein the detection circuit transmitting the driving signals to the plurality of scan areas in turn according to the first predetermined timing is the detection circuit transmitting a driving signal to each scan area column of the plurality of scan areas in turn according to the first predetermined timing.

* * * * *